United States Patent [19]
James et al.

[11] Patent Number: 6,035,377
[45] Date of Patent: *Mar. 7, 2000

[54] METHOD AND APPARATUS FOR DETERMINING MEMORY PAGES HAVING GREATEST FREQUENCY OF ACCESS IN A NON-UNIFORM MEMORY ACCESS COMPUTER SYSTEM

[75] Inventors: Larry C. James, West Columbia; Thomas E. Stonecypher, Jr., Columbia, both of S.C.

[73] Assignee: NCR Corporation, Dayton, Ohio

[ * ] Notice: This patent is subject to a terminal disclaimer.

[21] Appl. No.: 08/982,181

[22] Filed: Dec. 17, 1997

[51] Int. Cl.$^7$ ...................................................... G06F 13/00
[52] U.S. Cl. ........................ 711/147; 711/154; 711/156; 711/169; 711/172; 711/163; 709/214
[58] Field of Search ..................................... 711/147, 148, 711/152, 153, 170, 173, 154, 169, 172, 156; 709/216, 217, 218, 215, 214

[56] References Cited

U.S. PATENT DOCUMENTS

| | | | |
|---|---|---|---|
| 4,035,778 | 7/1977 | Ghanem | 711/133 |
| 4,450,525 | 5/1984 | Demuth et al. | . |
| 4,453,209 | 6/1984 | Meltzer | 364/200 |
| 5,193,172 | 3/1993 | Arai et al. | 395/425 |
| 5,269,013 | 12/1993 | Abramson et al. | 395/425 |
| 5,710,907 | 1/1998 | Hagersten et al. | 711/148 |
| 5,721,828 | 2/1998 | Frisch | 709/217 |
| 5,727,150 | 3/1998 | Laudon et al. | 709/215 |
| 5,905,540 | 5/1999 | Miyashita et al. | 348/674 |

*Primary Examiner*—John W. Cabeca
*Assistant Examiner*—Pierre Michel Bataille
*Attorney, Agent, or Firm*—James M. Stover

[57] ABSTRACT

A method implemented in hardware to concurrently obtain memory access locality information for a large number of contiguous sections of system memory (pages) for the purposes of optimizing memory and process assignments in a multiple-node NUMA architecture computer system including a distributed system memory. Page access monitoring logic is included within each processing node which contains a portion of shared system memory. This page access monitoring logic maintains a plurality of page access counters, each page access counter corresponding to a different memory page address within the shared system memory. Whenever the processing node generates a transaction requiring access to a memory address within system memory, the page access monitoring logic increments a count value contained within the page access counter corresponding to the memory address to which access is sought. Each processing node further includes page access counter search logic connected to the plurality of page access counters, which is enabled upon completion of page access monitoring, for sequentially comparing the contents of each page access counter with a predetermined minimum count value to identify the page access counters having contents equal to or greater than the minimum count value, and to identify the memory page addresses associated with the page access counters having contents equal to or greater than the minimum count value. This information can thereafter be used to optimize memory and process assignments in the computer system.

4 Claims, 4 Drawing Sheets

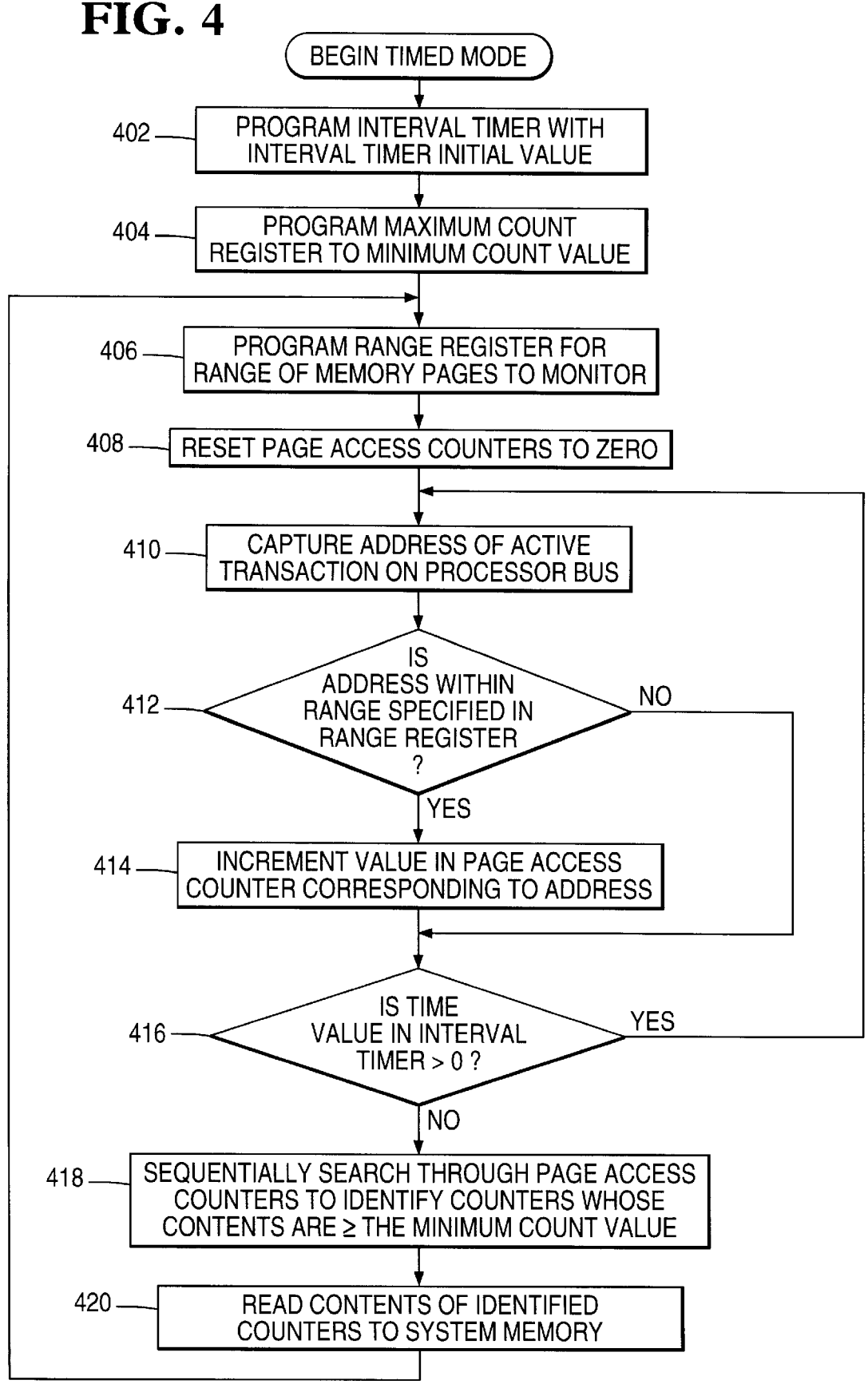

METHOD AND APPARATUS FOR DETERMINING MEMORY PAGES HAVING GREATEST FREQUENCY OF ACCESS IN A NON-UNIFORM MEMORY ACCESS COMPUTER SYSTEM

RELATED APPLICATIONS

The present application is related to U.S. patent application Ser. No. 08/881,413, entitled METHOD AND APPARATUS FOR DETERMINING MEMORY PAGE ACCESS INFORMATION IN A NON-UNIFORM MEMORY ACCESS COMPUTER SYSTEM, filed on Jun. 24, 1997. This related application is commonly assigned to the assignee of the present application.

The present invention relates to Non-Uniform Memory Access (NUMA) computer systems and, more particularly, to methods for optimizing memory and process assignments in NUMA computer systems.

BACKGROUND OF THE INVENTION

Multiprocessor computer systems can be generally divided into two categories: systems containing multiple processors having a shared common memory or having unshared distributed memories. Systems organized so that all processors have equal access to peripheral devices and shared memory are known as symmetric multiprocessing (SMP) systems. The processors within an SMP system may be connected to peripherals, shared memory and each other through a common bus, a bus hierarchy, a crossbar switch or a multistage network. In addition, the shared system memory may consist of multiple memory elements residing at different locations within the system or network.

In many of the SMP systems referred to above, the interconnection path between the various processors and memory elements may vary, resulting in different memory access times, or memory latencies, for each processor-memory combination. Access to "close" memory (for example, memory packaged on the same board as the processor) is much faster than "distant" memory (memory packaged on another processor board). In classic SMP designs employing uniform memory access (UMA), access to memory is uniformly governed by the speed of distant accesses. Memory access times are established to provide each processor with equal access time to system memory.

In a non-uniform memory access (NUMA) computer architecture, memory access latencies are allowed to differ depending on processor and memory locations. All processors in a NUMA system continue to share system memory, but the time required to access memory varies, i.e., is nonuniform, based on the processor and memory location. The main advantage of NUMA SMP designs over other alternatives to UMA SMA architectures is that, to an application or programmer, the NUMA memory model still appears as traditional SMP shared memory. As a result, NUMA systems can run existing SMP applications without modifications.

In a system wherein processors and memory are organized into two or more nodes, such as the system illustrated in FIG. 1, discussed below, performance of a particular processor is always best if it accesses memory from its own local node rather than from a more remote node. The present invention provides a mechanism to determine access patterns of all nodes in a system so the operating system can make decisions on optimal mapping of memory pages and processes to processors.

OBJECTS OF THE INVENTION

It is therefore an object of the present invention to provide a new and useful method for determining system memory page access patterns in NUMA multiprocessor computer systems.

It is another object of the present invention to provide such a method implemented in hardware within a NUMA multiprocessor computer system.

It is yet another object of the present invention to provide a new and useful method and apparatus for monitoring system bus transactions in a NUMA multiprocessor computer system to identify memory page access patterns in order to optimize mapping of memory pages and processes to processors within the multiprocessor system.

SUMMARY OF THE INVENTION

There is provided, in accordance with the present invention, a multiprocessor computer system comprising a plurality of processing nodes; a shared, distributed system memory; and a communication pathway connecting the plurality of processor nodes. Each processing node within the system includes a processor bus; at least one processor connected to the processor bus; a portion of the shared system memory; and a memory controller coupling the processor bus and communication pathway to the processing node portion of shared memory. The memory controller includes a plurality of page access counters, each page counter corresponding to a different memory page address within a specified range of addresses within system memory; and page access monitoring logic for reading from the processor bus memory page addresses associated with transactions placed unto the bus. As each address is read, a value maintained within the page access counter corresponding to the memory page address associated with the address read is incremented. The memory controller further includes page access counter search logic connected to the plurality of page access counters for sequentially comparing the contents of each page access counter with a predetermined minimum count value, identifying the page access counters having contents equal to or greater than the minimum count value, and identifying the memory page addresses associated with the page access counters having contents equal to or greater than the minimum count value.

In the described embodiment, the page access monitoring logic also includes an interval timer and maximum count register, providing two methods for controlling the period for which the monitoring logic operates to collect page access information. The interval timer can be used to define a set time period for which the system memory page access monitoring logic operates to increment the values maintained within the page access counters. Alternatively, the maximum count register can be preloaded with a maximum page access count value, which is the number of page accesses permitted to any page address within said shared memory. Once a page access counter reaches this maximum page access count value, sampling is halted.

When the period for collecting page access information has completed, the page access counter search logic is enabled to sequentially search through the page access counters to identify the page access counters having contents equal to or greater than the minimum count value. Upon completion of this step, the count values stored within the page access counters are reset to zero, and the page access monitoring logic again enabled to monitor the same or a different range of addresses within system memory.

The above and other objects, features, and advantages of the present invention will become apparent from the following description and the attached drawings.

BRIEF DESCRIPTION OF THE DRAWINGS

FIG. 4 is a flow diagram illustrating a second mode of operation of the page access monitoring logic shown in FIG. 2.

DETAILED DESCRIPTION OF THE PREFERRED EMBODIMENT

Figure 1:
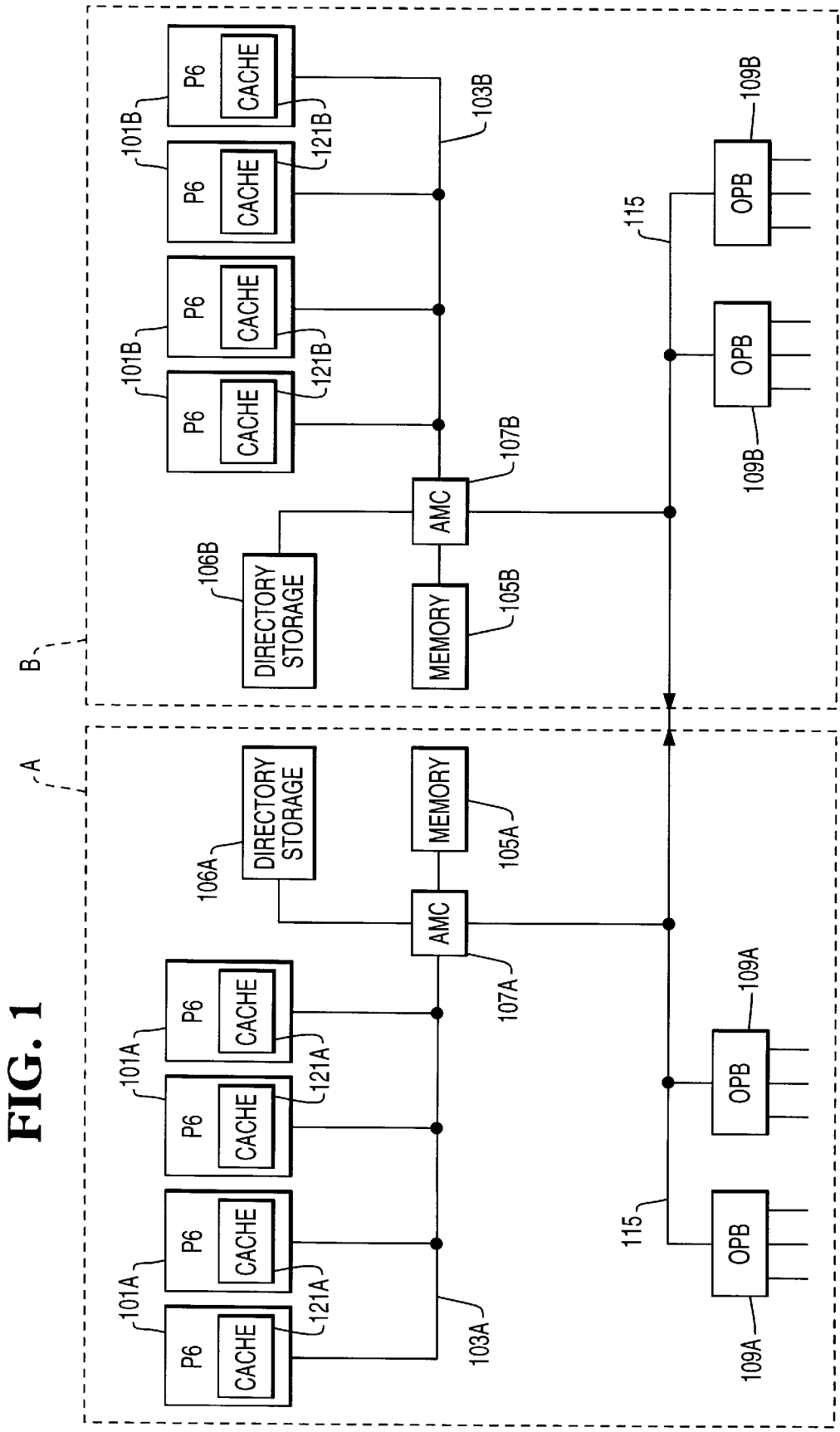
FIG. 1 is a simple block diagram representation of an eight-processor standard high volume (SHV) symmetric multiprocessing (SMP) computer system employing a non-uniform memory access (NUMA) architecture.

Referring now to FIG. 1, there is seen an eight-processor SMP system formed of two four-processor building blocks or complexes, identified by reference numerals A and B. Each complex is seen to include identical structure and components, which are identified by reference numerals ending in either an A or a B, for complex "A" and "B", respectively.

The portion of the system contained in complex A is seen to include up to four processors 101A connected to a high-bandwidth split-transaction processor bus 103A. Associated with each processor 301A is a cache memory 321A. A system memory 105A is connected to bus 103A through an advanced dual-ported memory controller 107A. The processor bus 103A is connected to the first port of memory controller 107A. The second memory controller port connects to a high bandwidth I/O bus 115, also referred to herein as an expansion bus, which provides connection for multiple PCI I/O interfaces 109A. All of these components, with the exception of advanced memory controller 107A, are currently available commodity components. For example, processors 101A may be Intel Pentium Pro processors and busses 103A and 115 may be Pentium Pro (P6) bus topology.

The advanced memory controller (AMC) 107A manages control and data flow in all directions between processor bus 103A and I/O bus 115. The I/O bus may contain P6 to PCI I/O Bridges and another AMC ASIC for connectivity to another processor bus, as will be discussed below. The AMC 107A also controls access to a coherent DRAM memory array.

As stated earlier, complex B has a construction identical to complex A. The two complexes are interconnected by expansion bus 115, allowing for communication between the processors 101A and 101B, system memories 105A and 105B, as well as shared I/O devices, cache memories, and other components.

Communication between any one of processors 101A and "close" system memory 105A is provided through processor bus 103A and memory controller 107A, however the communication pathway between any one of processors 101A and "distant" system memory 103B is less direct. The communication pathway between any one of processors 101A and system memory 103B includes processor bus 103A, memory controller 107A, I/O bus 115, and memory controller 105B. Obtaining use of these communication pathway elements will normally result in greater memory access latencies when one of processors 101A requires access to system memory 103B rather than system memory 103A. Similarly, greater memory access latencies should be expected when one of processors 101B requests access to system memory 103A rather than system memory 103B.

Each memory controller 107A and 107B includes logic for monitoring transactions between the local processors 101A and 101B, respectively, and system memory. The monitoring logic, shown in FIG. 2, successively examines memory addresses which appear on the local processor bus, either bus 103A or 103B, to construct a table or histogram which correlates a count of memory page accesses with each page address within a monitored address range occurring within a predefined sample time period.

Figure 2:
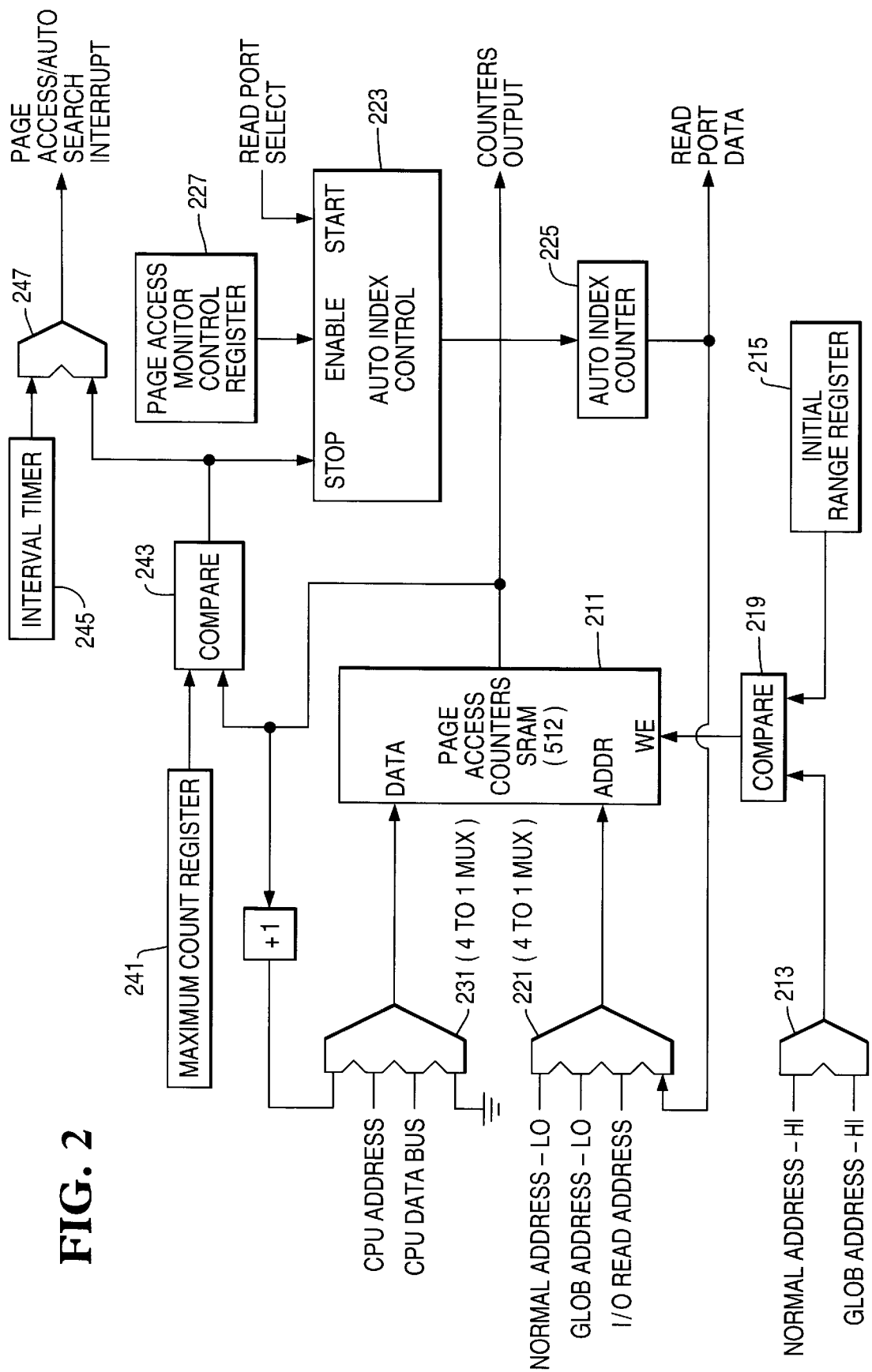
FIG. 2 is a simple block diagram representation of logic contained within the memory controllers shown in FIG. 1 for monitoring page accesses in accordance with the present invention.

The principal elements of the page access monitoring logic shown in FIG. 2 include a set of page access counters which are implemented with a 512-entry SRAM 211. Within SRAM 211, each page access counter counts the number of accesses to a specific address range (page), and the set of counters operate over a contiguous group of addresses. A separate programmable range register 215 defines the range of addresses to be counted. A programmable maximum count register 241 is provided to determine when to terminate counting as described below. Alternatively, an interval timer counter 245 may be utilized to determine the duration of a sample.

The monitoring logic further includes a first 2:1 multiplexer 213. Two inputs are provided to multiplexer 213: a normal address, and a glob address, either of which may be selected to be the output of multiplexer 213. The outputs of multiplexer 213 and initial range register 215 are provided to a compare logic circuit 219, the output of which is provided to a write enable (WE) input of SRAM 211.

A first 4:1 multiplexer 221 is connected to provide an address to an address select input (ADDRS) of SRAM 211. Four input signals are provided to multiplexer 221: a normal address, a glob address, a configuration I/O read address, and the output of auto index counter 225.

The output of a second 4:1 multiplexer 231 is connected to the data input (DATA) of SRAM 211. Four input signals are provided to multiplexer 231: a processor address, data from the processor data bus, the output of SRAM 211 incremented by one, or a zero data value.

The output of SRAM 211 and the output of maximum count register 241 are provided to compare logic circuit 243. The output of compare logic circuit 243 and interval timer 245 are provided to a second 2:1 multiplexer 247.

The output of compare logic 243 is further provided to an auto index control logic circuit 223. Auto index control logic 223 includes three inputs: a STOP input connected to receive the output of compare logic 243, an ENABLE input connected to receive an enable signal from a page access monitor control register 227, and a START input connected to receive an externally generated READ PORT SELECT signal. Auto index control logic 223 provides a control signal to an auto index counter 225. Auto index control logic 243, auto index counter 225 and control register 227, operate, as will be described below, to sequentially read the contents of page access counters 512.

Prior to the start of monitoring operation, range register 215 is programmed for the desired base range of memory pages to monitor. When the page access monitor logic is initially enabled, all the page access counters are reset to a value of zero. In the implementation shown using SRAM 211, each location within SRAM 211 is sequentially accessed through operation of auto index counter 225 and set to a value of zero. Monitoring of bus activity thereafter begins.

The address of the active transaction on the processor bus selects a unique page access counter, and the contents of the counter are incremented if the address is in the range specified by range register 215. Every transaction on the system bus that is within the range specified by the range register will increment a specific page access counter. The page access counter typically corresponds to an address range equal to the page size of the operating system, but could be of any granularity. The current implementation has two page size selections: a standard page size of 4K bytes and a 2 Mbytes page size. The larger page size mode, referred to as "Glob Page Mode" is used to perform a quick search of memory for most active sections.

Figure 3:
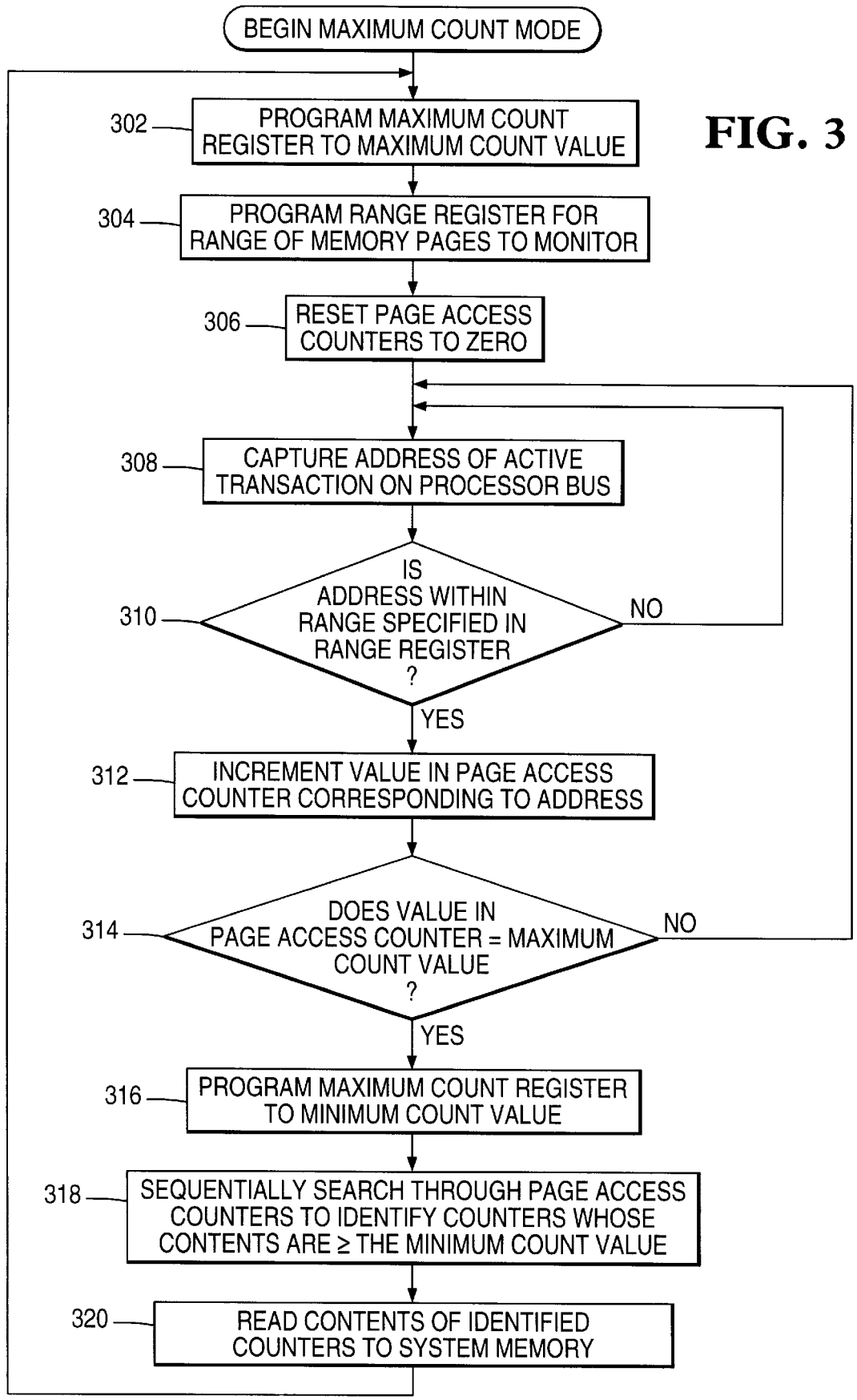
FIG. 3 is a flow diagram illustrating a first mode of operation of the page access monitoring logic shown in FIG. 2.

The page access monitoring logic, as shown in FIG. 2 supports two modes of operation: a maximum count sample mode and a timed sample mode. In the maximum count sample mode the page access monitoring logic shown in FIG. 2 monitors processor bus activity until a particular page access counter exceeds a value programmed into the maximum count register 241, as illustrated in the flow diagram of FIG. 3. At the initiation of operation, maximum count register 241 is loaded with a maximum page access count value (step 302) which is the number of page accesses permitted to a particular page address before a page access monitoring interrupt signal is generated by the monitoring logic indicating the end of a sample period. Range register 215 is also programmed with an address value which defines the group of pages to be monitored (step 304). Also at this time, the page access counters are each set to contain a zero count (step 306).

Monitoring transpires with the successive capture of addresses for active transactions as they are presented on the processor bus (step 308). Following the capture of an address, the captured address is compared with the range of addresses specified by range register 215 (step 310). If the captured address is within the range of addresses specified by the range register, than the page counter contained within SRAM 211 corresponding to the captured address is incremented by one (step 312). If the captured address is not found to be included in the range of monitored addresses, no additional action takes place concerning the captured address.

Steps 308 through 312 are repeated for successive addresses captured from the processor bus until the count contained within any page access counter grows equivalent to the maximum page access count value contained within maximum count register 241 (step 314). Once this occurs, the page access monitoring logic will generate a page access monitoring interrupt signal indicating that the sampling for the range of page addresses currently specified by range register 215 has been completed. The monitoring interrupt signal is provided to system software.

Upon receipt of the monitoring interrupt signal, system software operates to reprogram maximum count register 241 with a minimum count or "search" value (step 316). This minimum count value can not exceed the maximum count value previously loaded into maximum count register 241.

The page access monitoring logic is placed in an auto-search mode, and auto index control logic circuit 223 placed into an enabled state, by setting a search mode bit within page access monitor control register 227. A search through the page access counters to identify counters containing count values which exceed the minimum count value loaded into maximum count register 241 thereafter begins when the system software provides a READ PORT SELECT signal to the START input of auto index control logic circuit 223.

Auto index counter 225, under direction of auto index control logic circuit 223 sequentially addresses the page counters contained within SRAM 211. As each page counter is addressed, the count value contained therein is compared with the minimum count value contained within maximum count register 241 (step 318). When a count value is found which matches the search criteria, a search interrupt signal is generated by compare logic 243 and provided to the STOP input of auto index control logic circuit 223 and to the system software. The system software can then read to system memory the contents of the matching counter along with an index that identifies the counter number and therefor the address of the system memory page which corresponds to the counter (step 320). The system software thereafter resumes the search operation by providing a READ PORT SELECT signal to the START input of auto index control logic circuit 223.

The search continues until all the page access counters in SRAM 211 have been examined. To indicate that the search has been completed, a count value of zero and an index value of zero are returned to the system software. The page access monitoring logic is then returned to the page access monitoring mode. The maximum count register is again loaded with the maximum count value, a new range register value is programmed into range register 215, and the page counters reset to zero, to allow a new range of pages to be sampled. The process illustrated in steps 302 through 320 will then be repeated for this new range, as well as for subsequent ranges of page addresses until all memory locations have been sampled. The collected history of memory activity can thereafter be reviewed to determine how to physically map memory or allocate processes to processors to run specific processes in order to reduce memory latencies and optimize system operation. The process described above is especially useful for monitoring a specific remote address range to determine if access rates are excessive.

Referring to FIG. 4, a flow diagram for operation of the page access monitor control logic in timed sample mode in accordance with the present invention is shown. At the initiation of the timed sample mode of operation, interval timer 245 is preloaded with an initial value (step 402) which is the number of bus clocks before a monitoring interrupt signal is generated by the monitoring logic indicating the end of a sample period. Maximum count register is also programmed with the minimum count value of interest to the user during the auto search process (step 404). Additionally, range register 215 is programmed with an address value which defines the group of pages to be monitored (step 406) and the page access counters are each set to contain a zero count (step 408).

Monitoring transpires with the successive capture of addresses for active transactions as they are presented on the processor bus (step 410). Following the capture of an address, the captured address is compared with the range of addresses specified by range register 215 (step 412). If the captured address is within the range of addresses specified by the range register, than the page counter contained within SRAM 211 corresponding to the captured address is incremented by one (step 414). If the captured address is not found to be included in the range of monitored addresses, no additional action takes place concerning the captured address.

Steps 410 through 414 are repeated for successive addresses captured from the processor bus as long as time remains in interval timer 245, as indicated by decision block 416. Once the value held within interval timer 245 has decremented to zero, the interval timer will generate a monitoring interrupt signal indicating that the sampling for the range of page addresses currently specified by range register 215 has been completed. The monitoring interrupt signal is provided to system software.

Upon receipt of the monitoring interrupt signal, the page access monitoring logic is placed in an auto-search mode to identify page access counters containing count values which exceed the minimum count value loaded into maximum count register 241 (step 418), and provide to system memory the contents of the matching counters along with a corresponding index that identifies the counter numbers (step 420). The auto-search operation was described in greater detail above in the discussion of FIG. 3 and the maximum count mode of operation of the page access monitoring logic.

The page access monitoring logic is then returned to the page access monitoring mode. A new range register value can then be programmed into range register 215, and the page counters again reset to zero, to allow a new range of pages to be sampled. The process illustrated in steps 404 through 420 will then be repeated for this new range, as well as for subsequent ranges of page addresses until all memory locations have been sampled.

It can thus be seen that there has been provided by the present invention a new and useful method, implemented in hardware, for determining system memory page access patterns in NUMA multiprocessor computer systems. The described method and apparatus for monitoring system bus transactions to identify memory page access patterns facilitates remapping of memory pages and processes in order to optimize system performance.

Although the presently preferred embodiment of the invention has been described, it will be understood that various changes may be made within the scope of the appended claims.

What is claimed is:

1. In a multiprocessor computer system comprising a plurality of processing nodes; a shared, distributed system memory; and a communication pathway connecting said processing nodes; wherein each one of said processing nodes includes at least one processor; and a portion of said shared system memory coupled to said processor and said communication pathway; a method for monitoring memory page accesses to said shared system memory; the method comprising the steps of:

a) maintaining a plurality of page access counters, each one of said page access counters corresponding to a different memory page address within said shared system memory;

b) establishing a maximum page access count value which is the number of page accesses permitted to any page address within said shared memory;

c) successively capturing memory page addresses for active transactions as the transactions are presented by said processors during said monitoring period;

d) for each captured memory page address, incrementing a value maintained within the page access counter corresponding to said captured memory page address;

e) repeating steps c and d until the value maintained within one of said page access counters equals said maximum page access count value; and f) comparing the contents of each one of said plurality of page access counters with a predetermined minimum count value, identifying said page access counters having contents at least equivalent to said minimum count value, and identifying the memory page addresses associated with said page access counters having contents at least equivalent to said minimum count value.

2. In a multiprocessor computer system comprising a plurality of processing nodes; a shared, distributed system memory; and a communication pathway connecting said processing nodes; wherein each one of said processing nodes includes at least one processor; and a portion of said shared system memory coupled to said processor and said communication pathway; a method for monitoring memory page accesses to said shared system memory; the method comprising the steps of:

maintaining a plurality of page access counters, each one of said page access counters corresponding to a different memory page address within said shared system memory;

establishing a monitoring time period;

successively capturing memory page addresses for active transactions as the transactions are presented by said processors during said monitoring period;

for each captured memory page address, incrementing a value maintained within the page access counter corresponding to said captured memory page address; and following the conclusion of said sampling period, comparing the contents of each one of said plurality of page access counters with a predetermined minimum count value, identifying said page access counters having contents at least equivalent to said minimum count value, and identifying the memory page addresses associated with said page access counters having contents at least equivalent to said minimum count value.

3. A multiprocessor computer system comprising:

a plurality of processing nodes;

a shared, distributed system memory; and a communication pathway connecting said plurality of processing nodes;

wherein each one of said processing nodes includes:

at least one processor;

a portion of said shared system memory coupled to said processor and said communication pathway;

a plurality of page access counters, each one of said page access counters corresponding to a different memory page address within said shared system memory;

system memory page access monitoring logic connected to said processor for reading a memory page address associated with a transaction initiated by said processor and incrementing a value maintained within the page access counter corresponding to the memory page address associated with said transaction, said system memory page access monitoring logic including a range register programmed with a first address value which defines a group of page addresses to be monitored;

an interval timer for controlling the time period for which said system memory page access monitoring logic operates to increment the values maintained within said page access counters, said interval timer generating a monitoring complete signal upon conclusion of said time period;

page access counter search logic connected to said plurality of page access counters, said page access counter search logic further connected to receive said monitoring complete signal and responsive thereto to compare the contents of each one of said plurality of page access counters with a predetermined minimum count value, identify said page access counters having contents at least equivalent to said minimum count value, and identify the memory page addresses associated with said page access counters having contents at least equivalent to said minimum count value, said page access counter search logic generating a search complete signal upon conclusion of operation; and control logic connected to receive said search complete signal and responsive thereto to:

reset said interval timer;

clear the count values stored within said page access counters;

program said range register with a second address value which defines a second group of page addresses to be monitored.

4. A multiprocessor computer system comprising:

a plurality of processing nodes;

a shared, distributed system memory; and a communication pathway connecting said plurality of processing nodes;

wherein each one of said processing nodes includes:

at least one processor;

a portion of said shared system memory coupled to said processor and said communication pathway;

a plurality of page access counters, each one of said page access counters corresponding to a different memory page address within said shared system memory;

system memory page access monitoring logic connected to said processor for reading a memory page address associated with a transaction initiated by said processor and incrementing a value maintained within the page access counter corresponding to the memory page address associated with said transaction, said system memory page access monitoring logic including a range register programmed with a first address value which defines a group of page addresses to be monitored;

a maximum count register containing a maximum page access count value which is the number of page accesses permitted to any page address within said shared memory;

compare logic for comparing the maximum page access count value contained within said maximum count register with the values maintained within said page access counters and generating a monitoring complete signal indicating the completion of system memory page access monitoring logic operation when the value maintained within one of said page access counters equals said maximum page access count value, page access counter search logic connected to said plurality of page access counters, said page access counter search logic further connected to receive said monitoring complete signal and responsive thereto to compare the contents of each one of said plurality of page access counters with a predetermined minimum count value, identify said page access counters having contents at least equivalent to said minimum count value, and identify the memory page addresses associated with said page access counters having contents at least equivalent to said minimum count value, said page access counter search logic generating a search complete signal upon conclusion of operation; and control logic connected to receive said search complete signal and responsive thereto to:

clear the count values stored within said page access counters;

program said range register with a second address value which defines a second group of page addresses to be monitored.

* * * * *